Patented Mar. 10, 1953

2,631,081

UNITED STATES PATENT OFFICE 2,631,081

LEAD CARBONATE IMPRESSION MATERIALS

Stanley E. Noyes and Edwin H. Lochridge, Glendale, Calif., assignors to Dental Perfection Company, Glendale, Calif., a corporation of California No Drawing. Application March 28, 1952, Serial No. 279,227

8 Claims. (Cl. 18—47)

This invention relates to new compositions in elastic impression materials, and particularly dental impression materials, of the general type comprising a gel-forming agent and a metallic compound from which is made available in aqueous solution a metallic ion reactive with the gel-forming agent, either alone or with other metallic ions in the composition, to form the elastic gel component. Also commonly used in such materials are any of various retarders, the action and effect of which is by reason of their reactivity with the metallic compound or compounds, to delay formation of the gel over such period of time which will permit placement of the material against the subject to be molded or cast. Used as a dental impression material, arrival of the mixture at its gel point is delayed in the order of two to three minutes at mouth temperature. Such impression materials may also contain any of various fillers which are relatively or totally inert chemically, and serve essentially as physical body builders.

The invention is particularly concerned with new impression material compositions of this type employing compounds of lead, partially or entirely as the source of metallic ions reactive with the gel-forming component. As to the particular lead compound herein contemplated, our major object is to employ a lead salt complex which in the composition and aqueous solution formulated is sufficiently reactive with the gelling agent as to assure formation of a desirably shape-sustaining elastic gel within practicable time limits, and which also has such chemical stability within the composition in its dry packaged condition as will give to the material good shelf life over long periods of time. Heretofore it has been proposed to use certain lead compounds, for example lead oxide, which while having suitable reactivity with the gel-forming agent, adversely affect the desirable or necessary shelf life of the material.

In accordance with the invention we have found that proper gellation and extended shelf life may be achieved by impression material compositions containing a basic lead carbonate as a source of lead ions in the formation of the gel. As will appear, by reason of the chemical combination of the lead ions in the salt complex, the lead compound is found to possess the stability required for proper shelf life of the material.

Before proceeding to a more specific description and exemplification, it may be mentioned that the invention contemplates the use of any suitable gel-forming material in the general class consisting of the alginates (e. g. sodium, potassium, or ammonium alginate) the pectin derived gellable materials including the pectin salts and pectates, and the oxidized cellulosic gellable substances such as sodium, potassium, or ammonium carboxy methylcellulose. For purposes of the present invention the alginates may be regarded as preferred, but in its broad aspects the invention contemplates the use of any of these gelling agents, or mixtures thereof, which are combinable with a metal ion, as in a base exchange type reaction, to form an elastic gel capable of accurately reproducing the subjects to be cast.

Commonly used retarders include the alkali metal carbonates, notably sodium carbonate, and the alkali metal phosphates and polyphosphates, e. g. trisodium phosphate and polyphosphate, sodium meta, ortho and pyrophosphates. Also useable as the retarder may be the metal salts of substituted acids of ethylene diamine dealt with in a copending application Serial No. 260,929 of Edwin H. Lochridge, filed December 10, 1951. The invention contemplates that any of these retarders or mixtures thereof may be used in accordance with the requirements of any particular impression material.

These impression materials also include appropriate fillers such as powdered talc, clay, diatomaceous earth, calcium carbonate, silica and the like, all of which are relatively inert.

Basic lead carbonate which appears to have the formula $2PbCO_3 \cdot Pb(OH)_2$, is a double compound of lead hydroxide and lead carbonate, which in its reactivity with the gel-forming agent is believed to release lead ions from the hydroxide constituent to form e. g. lead alginate, while the lead carbonate constituent appears to function as a stabilizer for the reactive lead hydroxide. The lead carbonate may be used alone or with other metallic compounds such as calcium, zinc or strontium salts.

The following are given as typical examples of impression materials whose compositions render them suitable as dental impression materials.

Example 1

5.5 grams diatomaceous earth
2.2 grams sodium alginate
.5 gram tetrasodium pyrophosphate
.5 gram $Na_2SiF_6$
5.0 grams basic lead carbonate

Example 2

5.5 grams diatomaceous earth
2.2 grams sodium alginate
.2 gram tetrasodium pyrophosphate .3 gram Na$_2$SiF$_6$
.5 gram Hydrocal (CaSO$_4 \cdot \frac{1}{2}$H$_2$O)
5.0 grams basic lead carbonate

We claim:

1. An impression composition capable of forming in aqueous solution an elastic gel, comprising a gel-forming agent of the group consisting of a water-soluble alginate, a pectin material and carboxy methyl cellulose, and basic lead carbonate reactive therewith.

2. An impression composition capable of forming in aqueous solution an elastic gel, comprising a gel-forming agent of the group consisting of a water-soluble alginate, a pectin material and carboxy methyl cellulose, a fluosilicate and basic lead carbonate reactive with said agent.

3. An impression composition capable of forming in aqueous solution an elastic gel, comprising a gel-forming agent of the group consisting of a water-soluble alginate, a pectin material and carboxy methyl cellulose, calcium sulphate and basic lead carbonate reactive with said agent.

4. An impression composition capable of forming in aqueous solution an elastic gel, comprising a gel-forming agent of the group consisting of a water soluble alginate, a pectin material and carboxy methyl cellulose, a filler, a retarder, and basic lead carbonate reactive with said agent.

5. An impression material as defined in claim 4, containing also a fluosilicate.

6. An impression composition capable of forming in aqueous solution an elastic gel, comprising a water soluble alginate and basic lead carbonate reactive therewith.

7. An impression composition capable of forming in aqueous solution an elastic gel, comprising a gellable pectin material and basic lead carbonate reactive therewith.

8. An impression composition capable of forming in aqueous solution an elastic gel, comprising carboxymethyl cellulose and basic lead carbonate reactive therewith.

STANLEY E. NOYES.
EDWIN H. LOCHRIDGE.

REFERENCES CITED

The following references are of record in the file of this patent:

UNITED STATES PATENTS

| Number | Name | Date |
|---|---|---|
| 2,422,497 | Noyes | June 17, 1947 |
| 2,568,752 | Lockridge | Sept. 25, 1951 |